(12) United States Patent
Houdek et al.

(10) Patent No.: US 12,066,230 B2
(45) Date of Patent: Aug. 20, 2024

(54) EVAPORATOR APPARATUS

(71) Applicant: THERMO KING CORPORATION, Minneapolis, MN (US)

(72) Inventors: Pavel Houdek, Kutna Hora (CZ); Martin Galansky, Rakovnik (CZ); Martin Maska, Chynava (CZ)

(73) Assignee: Thermo King LLC, Minneapolis, MN (US)

( * ) Notice: Subject to any disclaimer, the term of this patent is extended or adjusted under 35 U.S.C. 154(b) by 0 days.

(21) Appl. No.: 17/834,323

(22) Filed: Jun. 7, 2022

(65) Prior Publication Data

US 2022/0412623 A1 Dec. 29, 2022

(30) Foreign Application Priority Data

Jun. 23, 2021 (EP) .................................... 21181290

(51) Int. Cl.
 *F25B 49/02* (2006.01)
 *F25B 5/02* (2006.01)
 *F25B 41/325* (2021.01)
(52) U.S. Cl.
 CPC ............... *F25B 49/02* (2013.01); *F25B 5/02* (2013.01); *F25B 41/325* (2021.01); *F25B 2600/2513* (2013.01)
(58) Field of Classification Search
 CPC .......... F25B 49/02; F25B 41/325; F25B 5/02; F25B 2600/2513
 See application file for complete search history.

(56) References Cited

U.S. PATENT DOCUMENTS

| 5,007,245 | A | 4/1991 | Defenbaugh et al. |
| 2018/0320934 | A1* | 11/2018 | Clark .................. F25B 7/00 |
| 2020/0247213 | A1 | 8/2020 | Schroeder et al. |
| 2021/0116156 | A1 | 4/2021 | Waters et al. |

OTHER PUBLICATIONS

Extended European Search Report, issued in the corresponding EP patent application No. 21181290.4, dated Nov. 30, 2021, 8 pages.

* cited by examiner

*Primary Examiner* — Nael N Babaa
(74) *Attorney, Agent, or Firm* — HSML P.C.

(57) ABSTRACT

An evaporator apparatus for a refrigeration cycle of an HVAC system or a refrigeration system is disclosed that includes: a primary evaporator pathway for a working fluid of the refrigeration cycle extending through a primary expansion device and a primary evaporator; a secondary evaporator pathway for the working fluid in parallel with the primary evaporator pathway and extending through a secondary expansion device and a secondary evaporator; a coolant circuit for cooling a device, the secondary evaporator configured for heat exchange between the working fluid and process fluid of the coolant circuit; and a controller configured to control: the primary expansion device to maintain a target superheat of working fluid at a primary control location downstream of the primary evaporator; and the secondary expansion device based on monitoring a temperature of process fluid to maintain a target temperature of process fluid at a coolant control location in the coolant circuit.

13 Claims, 3 Drawing Sheets

EVAPORATOR APPARATUS

FIELD OF THE INVENTION

The invention relates to an evaporator apparatus for a refrigeration cycle of a refrigeration system, such as an HVAC system. It relates further to a refrigeration system having such an evaporator apparatus.

BACKGROUND OF THE INVENTION

A conventional refrigeration cycle requires a sequential flow path for a working fluid through a compressor, a condenser, an expansion device and an evaporator. The compressor and the condenser together form a condenser apparatus for rejecting heat from the working fluid of the refrigeration cycle, while the expansion device and the evaporator together form an evaporator apparatus for accepting heat into the working fluid of the refrigeration cycle.

STATEMENTS OF INVENTION

According to a first aspect there is disclosed evaporator apparatus for a refrigeration cycle of a refrigeration system. The evaporator apparatus comprises:
  a primary evaporator pathway for a working fluid of the refrigeration cycle extending through a primary expansion device and a primary evaporator;
  a secondary evaporator pathway for the working fluid in parallel with the primary evaporator pathway and extending through a secondary expansion device and a secondary evaporator;
  a coolant circuit for cooling a device, wherein the secondary evaporator is configured for heat exchange between the working fluid and a process fluid of the coolant circuit; and
  a controller configured to:
    control the primary expansion device to maintain a target superheat of the working fluid at a primary control location downstream of the primary evaporator; and
    control the secondary expansion device based on monitoring a temperature of the process fluid to maintain a target temperature of the process fluid at a coolant control location in the coolant circuit.

It may be that the primary evaporator pathway and the secondary evaporator pathway converge at a confluence point upstream of the primary control location.

The coolant control location may be downstream of the secondary evaporator, and at or upstream of the device to be cooled.

The device to be cooled may be selected from the group consisting of: a prime mover; a battery; an inverter; a capacitor; a power electronics device and a climate-controlled compartment.

It may be that the primary evaporator pathway and secondary evaporator pathway originate from a distributor line and diverge from the distributor line at a branch point configured to deliver working fluid to the respective pathways from the distributor line of the refrigeration cycle.

The secondary evaporator pathway and the coolant circuit may be configured so that the working fluid and the process fluid are provided to the secondary evaporator in a counter-current arrangement.

It may be that the primary expansion device and/or the secondary expansion device is an electronic expansion valve.

The target superheat may be between 0° C. and 2° C.

It may be that the secondary evaporator pathway is one of a plurality of secondary evaporator pathways, each secondary evaporator pathway being in accordance with the secondary evaporator pathway defined in any preceding claim.

According to a second aspect there is disclosed a refrigeration system comprising evaporator apparatus in accordance with the first aspect, wherein the primary and secondary evaporator pathways form part of a refrigeration cycle of the refrigeration system located downstream of a condenser and upstream of a compressor.

The refrigeration cycle and the coolant circuit may be configured to provide the working fluid and the process fluid to the secondary evaporator in a counter-current arrangement.

It may be that the refrigeration cycle is charged with a working fluid, wherein the working fluid comprises at least 50% carbon dioxide by weight.

It may be that the coolant circuit is charged with a process fluid, wherein the process fluid comprises at least 50% water by weight.

According to a third aspect, there is disclosed a method of operating evaporator apparatus in accordance with the first aspect or a refrigeration system in accordance with the second aspect, the method comprising:
  conveying a working fluid along the first evaporator pathway and along the second evaporator pathway;
  conveying a process fluid around the coolant circuit including through the secondary evaporator;
  controlling the primary expansion device to maintain a target superheat of the working fluid at the primary control location; and
  controlling the secondary expansion device based on monitoring a temperature of the process fluid, to maintain a target temperature of the process fluid at the coolant control location.

According to a fourth aspect there is disclosed a computer program comprising instructions which, when executed by a processor, cause the method in accordance with the third aspect to be carried out.

According to a fifth aspect there is disclosed a computer-readable storage medium comprising instructions which, when executed by a processor, cause the processor to carry out the method in accordance with the third aspect.

INTRODUCTION TO THE DRAWINGS

DETAILED DESCRIPTION

Figure 1:
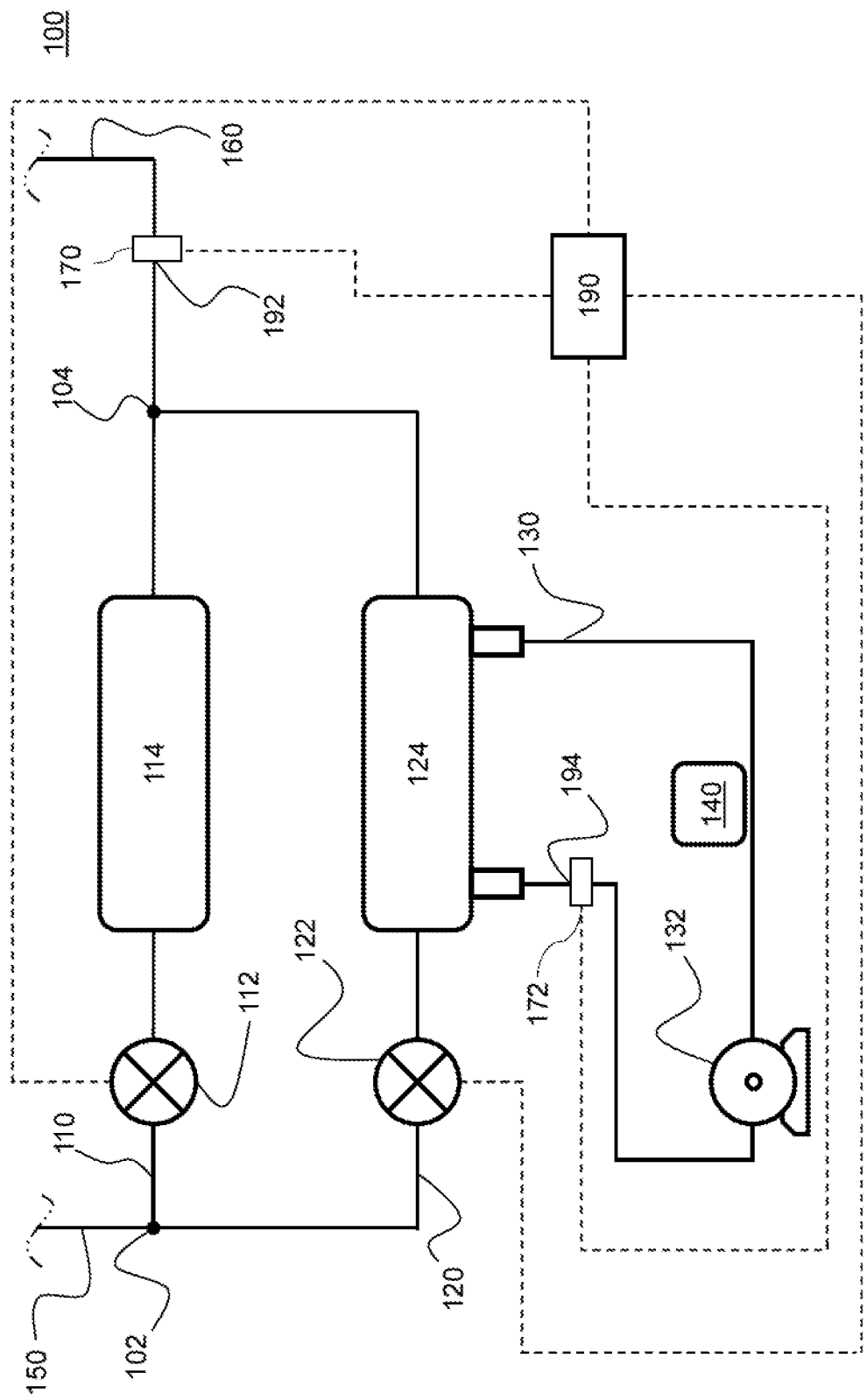
FIG. 1 shows an example evaporator apparatus for a refrigeration cycle of a refrigeration system.

FIG. 1 shows an example evaporator apparatus 100 for a refrigeration cycle of a refrigeration system, such as a heat ventilation air conditioning (HVAC) system, the evaporator apparatus comprising a distributor line 150, a primary evaporator pathway 110, a secondary evaporator pathway 120, and a coolant circuit 130.

The distributor line 150 is configured to receive working fluid from a condenser apparatus of a refrigeration cycle. The primary evaporator pathway 110 and the secondary evaporator pathway 120 originate from the distributor line 150 and diverge from the distributor line 150 at a branch point 102, which is configured to deliver working fluid from the distributor line 150 to the primary evaporator pathway 110 and the secondary evaporator pathway 120. The coolant circuit 130 configured to receive a process fluid and is configured to cool a device 140 by heat exchange between the device 140 and the process fluid, when received in the coolant circuit 130.

The device to be cooled 140 may be a device which generates heat in use, for example a prime mover, a battery, an inverter, a capacitor, a power electronics device, and/or a climate-controlled compartment. The prime mover may be, for example, an internal combustion engine or an equivalent thereof. The device to be cooled 140 requires sufficient cooling to be provided by the coolant circuit 130 so as to ensure that a temperature of the device 140 is maintained below a threshold temperature. The threshold temperature may be, for example, a temperature above which the device to be cooled 140 is likely to suffer from thermal damage, increased degradation, and/or a malfunction.

The primary evaporator pathway 110 extends through a primary expansion device 112 and a primary evaporator 114. The primary expansion device 112 is configured to regulate a flow of working fluid through the primary evaporator pathway 110 to the primary evaporator 114.

The primary evaporator 114 is configured for heat exchange between the working fluid in the primary evaporator pathway 110 and an external medium. The external medium may be, for example, ambient air, air from a climate-controlled compartment, or ground.

The secondary evaporator pathway 120 extends through a secondary expansion device 122 and a secondary evaporator 124. The secondary expansion device 122 is configured to regulate a flow of working fluid through the secondary evaporator pathway 120 to the secondary evaporator 124.

The secondary evaporator 124 is configured for heat exchange between the working fluid in the secondary evaporator pathway 120 and the process fluid of the coolant circuit 130, such that the process fluid of the coolant circuit 130 is cooled at the secondary evaporator 124.

In this example, the primary expansion device 112 is an electronic expansion valve, and the secondary expansion device 122 is an electronic expansion valve.

The primary evaporator pathway 110 and the secondary evaporator pathway 120 converge at a confluence point 104, to a suction line 160 for delivering working fluid to the condenser apparatus of the refrigeration cycle.

The coolant circuit 130 further comprises a pump 132 configured to convey the process fluid around the coolant circuit 132 through the secondary evaporator 124.

The evaporator apparatus 100 further comprises a primary temperature sensor 170 at a primary control location 192 downstream of the primary evaporator 114. The primary temperature sensor 170 is configured to sense the temperature of the working fluid at the primary control location 192. In this example, the primary control location 192 is located on the suction line 160, downstream of the confluence point 104. In other words, the primary control location 192 is located downstream of both the primary evaporator 114 and the secondary evaporator 124.

In other examples, the primary control location may be located on the primary evaporator pathway 110 upstream of the confluence point 104.

The evaporator apparatus 100 also comprises a secondary temperature sensor 172, located at a coolant control location 194 in the coolant circuit 130. The secondary temperature sensor 172 is configured to sense the temperature of the process fluid in the coolant circuit 130 at the coolant control location 194. In this example, the coolant control location 194 is at an outlet of the secondary evaporator 124 (i.e. downstream of the secondary evaporator 124), upstream of a device 140 to be cooled. This allows channels in the coolant circuit 130 to be specifically designed for a known flow rate based on a target temperature of the process fluid downstream of the secondary evaporator 124 and upstream of or at the device to be cooled 140. In other examples, the coolant control location may be at an inlet of the secondary evaporator (i.e. upstream of the secondary evaporator), downstream of the device 140 to be cooled, or may be at the device to be cooled.

The evaporator apparatus 100 also includes a controller 190. The controller 190 is connected to the primary temperature sensor 170 to receive data from the primary temperature sensor 170, and the controller 190 is connected to the primary expansion device 112 to control the primary expansion device 112.

The controller 190 is configured to control the primary expansion device 112 based on the data received from the primary temperature sensor 170, to maintain a target superheat of the working fluid at the primary control location 192. In other words, the controller 190 receives a signal from the primary temperature sensor 170 corresponding to the temperature of the working fluid at the primary control location 192, the controller 190 is configured to determine a superheat parameter, relating to the superheat of the working fluid at the primary control location 192, based on the received signal, and the controller 190 is configured to control the primary expansion device 112 based on the determined superheat parameter, for example as explained in more detail with reference to FIG. 3.

The controller 190 is also configured to control the secondary expansion device 122 based on monitoring the temperature of the process fluid to maintain a target temperature of the process fluid at the coolant control location 194 in the coolant circuit 130. In other words, the controller 190 receives a signal from the secondary temperature sensor 172 corresponding to the temperature of the process fluid at the coolant control location 194, and the controller 190 is configured to control the secondary expansion device 122 based on the received signal.

The controller 190 may also be configured to control an operation of the pump 132. It will be appreciated that a plurality of controllers may provide the same function as the controller 190. For example, a first controller may be configured to control the primary expansion device 112 to maintain a target superheat of the working fluid at a primary control location 192 downstream of the primary evaporator 114, while a second controller may be configured to control the secondary expansion device 122 based on monitoring a temperature of the process fluid to maintain a target temperature of the process fluid at a coolant control location 194 in the coolant circuit 130.

Having two evaporator pathways in parallel, each having a corresponding expansion device which is individually controlled, allows a state of working fluid in the primary evaporator pathway 110 and the secondary evaporator 120 to be independently regulated. Consequently, the state of working fluid provided to each evaporator may be independently controlled by the controller 190 via each expansion device.

The target superheat of the working fluid at the primary control location 192 is selected to ensure that working fluid provided to the suction line 160 is in a single-phase gaseous state. If the target superheat is too low, there is a risk of working fluid containing liquid droplets being provided to the suction line 160. If working fluid containing liquid droplets is provided to the suction line 160, a compressor of a refrigeration system which is provided with the working fluid may be damaged by liquid slugging effects associated with two-phase working fluid being provided thereto. Accordingly, the target superheat should be selected so as to be sufficiently large and therefore reduce a risk of liquid slugging to a compressor of the refrigeration system.

On the other hand, if the target superheat is too high, the controller 190 may control the primary expansion device 112 to restrict the flow of working fluid in the primary evaporator pathway 110, thereby reducing its cooling performance. In some examples, the target superheat may be approximately 2° C. This provides a high level of certainty that any remaining liquid droplets in the working fluid are evaporated before being provided to the suction line 160, albeit with reduced cooling efficiency.

In this example, the target superheat is between 0° C. and 2° C. This reduces the pressure ratio required to operate the evaporator apparatus 100, which in turn improves cooling efficiency of the refrigeration system.

In this example, where the primary control location 192 is located in the suction line 160, working fluid in each of the primary evaporator pathway 110 and the secondary evaporator pathway 120 passes through the primary control location 192 prior to being discharged to a compressor of the refrigeration cycle. Therefore, although the controller 190 operates the secondary expansion device 122 without consideration for the discharge temperature (or superheat) of the working fluid into the suction line 160, the controller 190 can operate the primary expansion device 112 to compensate for this. In other words, the controller 190 is able to operate the primary expansion device 112 to maintain the target superheat at the primary control location 192 such that all of the fluid discharged to the suction line 160 of the refrigeration cycle is in a single-phase gaseous state whilst being able to operate the secondary expansion device 122 to ensure optimal cooling of the device 140 to be cooled.

Although it has been described that there is only one secondary evaporator pathway 120, in other examples, the secondary evaporator pathway 120 may be one of a plurality of secondary evaporator pathways. Each of the plurality of secondary evaporator pathways may have any and all of the features described above with respect to the secondary evaporator pathway 120.

Although it has been described that there is a primary temperature sensor 170 at the primary control location 192 and that there is a secondary temperature sensor 172 at the coolant control location 194, in other examples, there may be any type of sensor, or more than one sensor, at each location which is configured to determine any thermodynamic property of the working fluid or the process fluid respectively, such as a pressure sensor to sense the pressure of the fluid. In such examples, the controller 190 may be configured to receive the data from the sensor relating to the thermodynamic property of the respective fluid, and to control the primary expansion device 112 or the secondary expansion device 122 based on the data received to maintain the target superheat of the working fluid at the primary control location 192, and the process fluid at the target temperature at the coolant control location 194.

In examples in which both the pressure of the working fluid and the temperature of the working fluid at the primary control location 194 cannot be reliably estimated or inferred without directly sensing the respective property, there may be both a primary temperature sensor and a primary pressure sensor at the primary control location 192 which together function as a combined primary sensor. In such examples, the controller 190 may be configured to receive data from the combined primary sensor relating to the thermodynamic property of the respective fluid, and to control the primary expansion device 112 based on the data received to maintain the target superheat of the working fluid at the primary control location 192.

Figure 2:
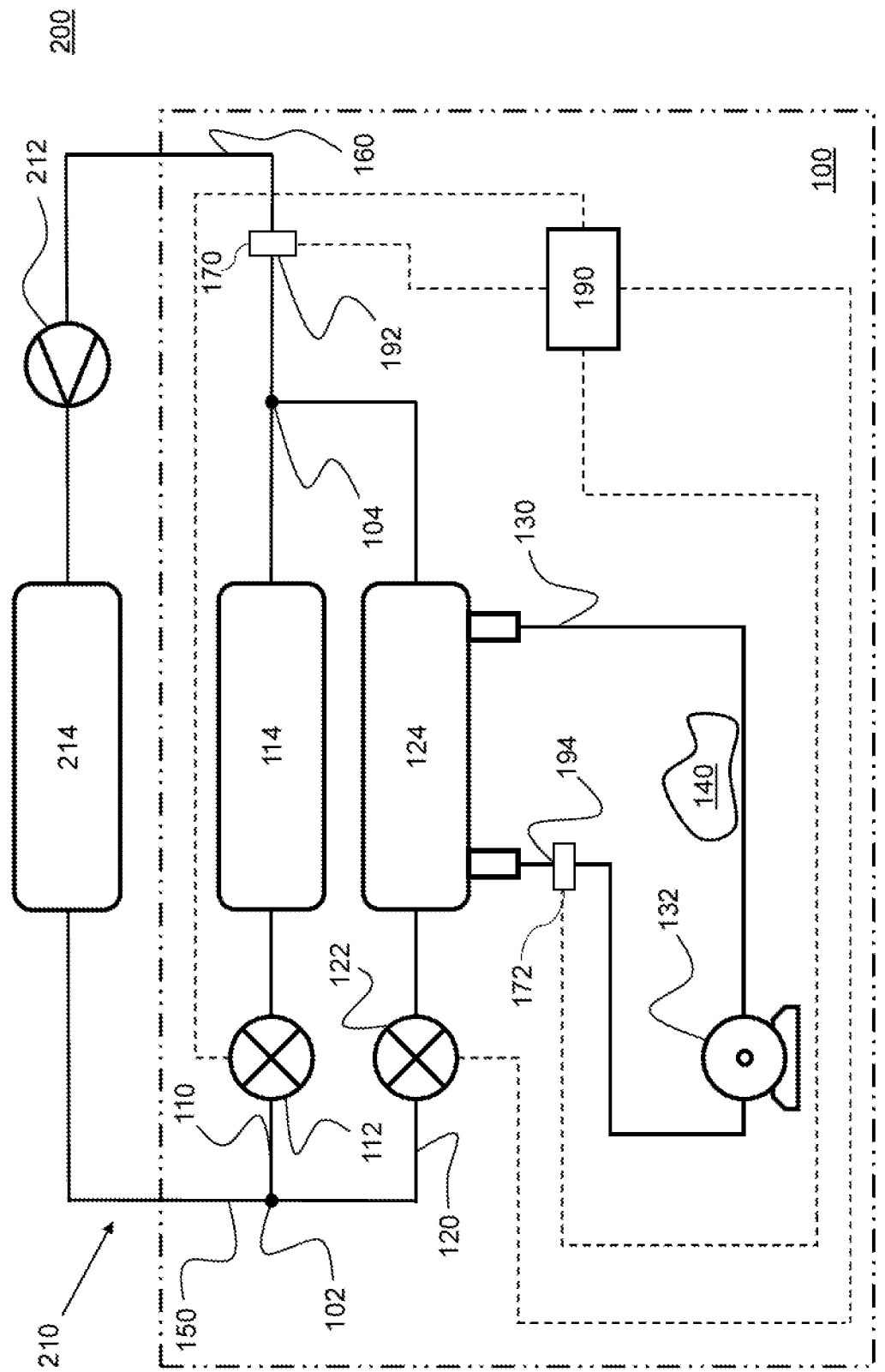
FIG. 2 shows an example refrigeration system comprising the example evaporator apparatus of FIG. 1.

FIG. 2 shows an example refrigeration system 200 comprising an evaporator apparatus 100 as described with reference to FIG. 1. The refrigeration system 200 further comprises a compressor 212 and a condenser 214, wherein the evaporator apparatus 100 is located downstream of the condenser 214 and upstream of a compressor 212. The primary evaporator pathway 110 and the secondary evaporator pathway 120 therefore form part of a refrigeration cycle 210 of the refrigeration system 200.

In this example, the refrigeration cycle 210 and the coolant circuit 130 are configured to provide the working fluid and the process fluid to the secondary evaporator 124 in a counter-current arrangement. The counter-current arrangement facilitates improved heat transfer between the working fluid and the process fluid, and a reduced temperature approach between the working fluid and the process fluid in the secondary evaporator 124. In other examples, the working fluid and process fluid may be pumped through the secondary evaporator 124 in a co-current arrangement.

In this example, the refrigeration cycle is charged with a working fluid comprising at least 50% carbon dioxide by weight. In other examples, the working fluid may comprise any suitable percentage of carbon dioxide by weight or may not include carbon dioxide at all.

Further, in this example, the coolant circuit 130 is charged with a process fluid comprising at least 50% water by weight. In other examples, the process fluid may comprise any suitable percentage of water by weight, such as between 20-80% water by weight.

Figure 3:
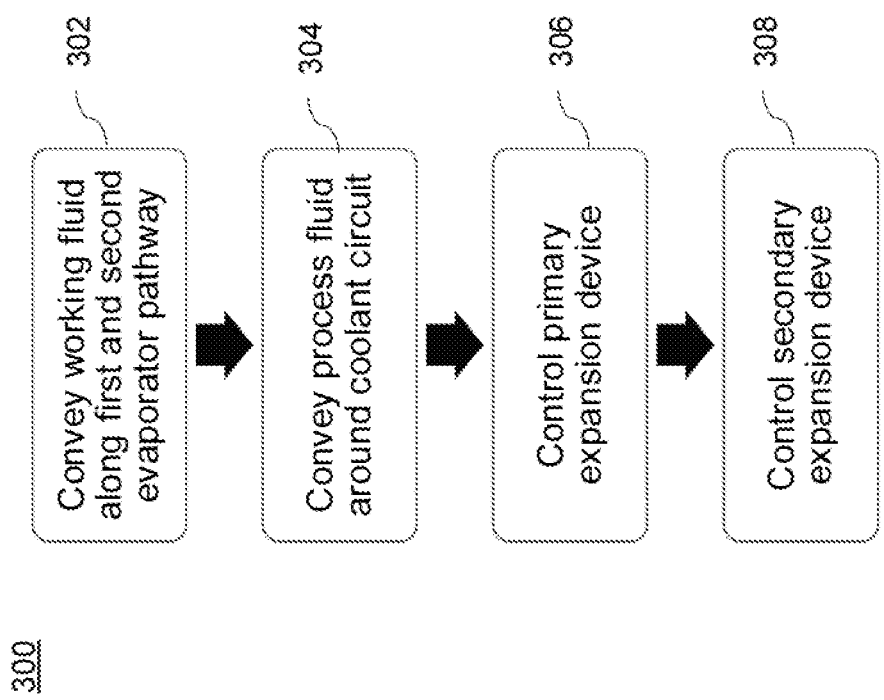
FIG. 3 is a flowchart which shows an example method of operating the evaporator apparatus of FIG. 1 or the example refrigeration system of FIG. 2.

FIG. 3 is a flowchart showing an example method 300 of operating evaporator apparatus 100 or a refrigeration system 200 as described with reference to FIGS. 1 and 2.

The example method 300 commences at block 302, which comprises conveying a working fluid along the first evaporator pathway 110 and along the second evaporator pathway 120. For example, the compressor 212 of the refrigeration system 200 may be used to convey working fluid along the first evaporator pathway 110 and along the second evaporator pathway 120.

At block 304, the example method 300 comprises conveying a process fluid around the coolant circuit 130 including through the secondary evaporator 124. For example, the pump 132 may be used to convey the process fluid around the coolant circuit 130. In the method, blocks 302 and 304 may be carried out simultaneously.

At block 306, the example method 300 also includes controlling the primary expansion device 112 to maintain a target superheat of the working fluid at the primary control location 192. For example, the controller 190 may receive data from the primary temperature sensor 170, and determine a superheat parameter, relating to the degree of superheat of the working fluid at the primary control location 192, based on the received data. The controller 190 may then control the primary expansion device 112 based on the superheat parameter. For example, if the superheat parameter indicates that the working fluid has a superheat above a target superheat, the controller 190 may control the primary expansion device 112 to open further to allow more flow of working fluid through the primary evaporator pathway 110. If the superheat parameter indicates that the working fluid has a superheat below a target superheat, the controller 190 may control the primary expansion device 112 to restrict an opening further, so as to reduce the flow of working fluid through the primary evaporator pathway 110. If the superheat parameter indicates that the working fluid has a superheat within a target superheat range, the controller 190 may not change the opening of the primary expansion device 112.

At block 308, the example method 300 controls the secondary expansion device 122 based on monitoring a temperature of the process fluid, to maintain a target temperature of the process fluid at the coolant control location 194. For example, the controller 190 may receive data from secondary temperature sensor 172, and based on the received data, may control the secondary expansion device 122 to open or close. For example, if the data from the secondary temperature sensor 172 indicates that the temperature of the process fluid at the coolant control location 194 is too high, the controller 190 may control the secondary expansion device 122 to open further in order to increase the cooling capacity in the secondary heat exchanger 124. If the data from the secondary temperature sensor 172 indicates that the temperature of the process fluid is too low, the controller 190 may control the secondary expansion device 122 to close further. If the data from the secondary temperature sensor 172 indicates that the temperature of the process fluid is within a target temperature range, or at or near a set point temperature, the controller 190 may not change the opening of the secondary expansion device 122.

Blocks 306 and 308 may be carried out simultaneously or concurrently. The method 300 may work continuously, or at predetermined or regular times. For example, the controller 190 may continuously monitor the data from the primary temperature sensor 170 and the secondary temperature sensor 172 and control the primary expansion device 112 and secondary expansion device 122 continuously based on the data. In other examples, the controller may monitor the data from the temperature sensors intermittently.

The controller(s) described herein may comprise a processor. The controller and/or the processor may comprise any suitable circuitry to cause performance of the methods described herein and as illustrated in the drawings. The controller or processor may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU), to perform the methods and/or stated functions for which the controller or processor is configured. The controller may comprise or the processor may comprise or be in communication with one or more memories that store that data described herein, and/or that store machine readable instructions (e.g. software) for performing the processes and functions described herein (e.g. determinations of parameters and execution of control routines).

The memory may be any suitable non-transitory computer readable storage medium, data storage device or devices, and may comprise a hard disk and/or solid state memory (such as flash memory). In some examples, the computer readable instructions may be transferred to the memory via a wireless signal or via a wired signal. The memory may be permanent non-removable memory, or may be removable memory (such as a universal serial bus (USB) flash drive). The memory may store a computer program comprising computer readable instructions that, when read by a processor or controller, causes performance of the methods described herein, and/or as illustrated in the Figures. The computer program may be software or firmware, or be a combination of software and firmware.

Except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

The invention claimed is:

1. Evaporator apparatus for a refrigeration cycle of a refrigeration system, the evaporator apparatus comprising:
   a primary evaporator pathway for a working fluid of the refrigeration cycle extending through a primary expansion device and a primary evaporator;
   a secondary evaporator pathway for the working fluid in parallel with the primary evaporator pathway and extending through a secondary expansion device and a secondary evaporator;
   a coolant circuit for cooling a device, wherein the secondary evaporator is configured for heat exchange between the working fluid and a process fluid of the coolant circuit; and
   a controller configured to:
   control the primary expansion device to maintain a target superheat of the working fluid at a primary control location downstream of the primary evaporator; and
   control the secondary expansion device based on monitoring a temperature of the process fluid to maintain a target temperature of the process fluid at a coolant control location in the coolant circuit,
   wherein the primary evaporator pathway and the secondary evaporator pathway converge at a confluence point upstream of the primary control location.

2. The evaporator apparatus according to claim 1, wherein the coolant control location is downstream of the secondary evaporator, and at or upstream of the device to be cooled.

3. The evaporator apparatus according to claim 1, wherein the device to be cooled is selected from the group consisting of: a prime mover; a battery; an inverter; a capacitor; a power electronics device and a climate-controlled compartment.

4. The evaporator apparatus according to claim 1, wherein the primary evaporator pathway and secondary evaporator pathway originate from a distributor line and diverge from the distributor line at a branch point configured to deliver working fluid to the respective pathways from the distributor line of the refrigeration cycle.

5. The evaporator apparatus according to claim 1, wherein the primary expansion device and/or the secondary expansion device is an electronic expansion valve.

6. The evaporator apparatus according to claim 1, wherein the target superheat is between 0° C. and 2° C.

7. A refrigeration system comprising:
   an evaporator apparatus including:
   a primary evaporator pathway for a working fluid of the refrigeration cycle extending through a primary expansion device and a primary evaporator;
   a secondary evaporator pathway for the working fluid in parallel with the primary evaporator pathway and extending through a secondary expansion device and a secondary evaporator;
   a coolant circuit for cooling a device, wherein the secondary evaporator is configured for heat exchange between the working fluid and a process fluid of the coolant circuit; and a controller configured to:
control the primary expansion device to maintain a target superheat of the working fluid at a primary control location downstream of the primary evaporator; and
control the secondary expansion device based on monitoring a temperature of the process fluid to maintain a target temperature of the process fluid at a coolant control location in the coolant circuit,
wherein the primary and secondary evaporator pathways form part of a refrigeration cycle of the refrigeration system located downstream of a condenser and upstream of a compressor,
wherein the primary evaporator pathway and the secondary evaporator pathway converge at a confluence point upstream of the primary control location.

8. The refrigeration system according to claim 7, wherein the refrigeration cycle and the coolant circuit are configured to provide the working fluid and the process fluid to the secondary evaporator in a counter-current arrangement.

9. The refrigeration system according to claim 7, wherein the refrigeration cycle is charged with a working fluid, wherein the working fluid comprises at least 50% carbon dioxide by weight.

10. The refrigeration system according to claim 7, wherein the coolant circuit is charged with a process fluid, wherein the process fluid comprises at least 50% water by weight.

11. A method of operating evaporator apparatus for a refrigeration system, the method comprising:
conveying a working fluid along a first evaporator pathway and along a second evaporator pathway, wherein the first evaporator pathway extends through a primary expansion device and a primary evaporator and wherein the second evaporator pathway is in parallel with the primary evaporator pathway and extends through a secondary expansion device and a secondary evaporator;
conveying a process fluid around a coolant circuit including through the secondary evaporator, wherein the cooling circuit is configured to cool a device and wherein the secondary evaporator is configured for heat exchange between the working fluid and a process fluid of the coolant circuit;
controlling the primary expansion device to maintain a target superheat of the working fluid at the primary control location; and
controlling the secondary expansion device based on monitoring a temperature of the process fluid, to maintain a target temperature of the process fluid at the coolant control location,
wherein the primary evaporator pathway and the secondary evaporator pathway converge at a confluence point upstream of the primary control location.

12. A computer program comprising instructions which, when executed by a processor, cause a method in accordance with claim 11 to be carried out.

13. A computer-readable storage medium comprising instructions which, when executed by a processor, cause the processor to carry out a method in accordance with claim 11.

* * * * *